United States Patent [19]

Wells et al.

[11] 3,941,042

[45] Mar. 2, 1976

[54] AUTOMATIC COFFEE BREWING SYSTEM

[75] Inventors: Daniel M. Wells, Hemet; James H. Tarrant, El Toro, both of Calif.

[73] Assignee: Farmer Bros. Co., Torrance, Calif.

[22] Filed: Mar. 1, 1974

[21] Appl. No.: 447,195

[52] U.S. Cl................................. 99/289 R; 99/307
[51] Int. Cl.²........................................... A47J 31/00
[58] Field of Search ............ 99/289, 281, 282, 283, 99/280, 300, 301, 302, 307; 426/77

[56] References Cited
UNITED STATES PATENTS

| | | | |
|---|---|---|---|
| 2,718,843 | 9/1955 | Jones | 99/289 |
| 3,092,011 | 6/1963 | Gee | 99/289 |
| 3,338,153 | 8/1967 | Holstein | 99/289 |
| 3,390,626 | 7/1968 | Holstein | 99/283 |

*Primary Examiner*—Robert W. Jenkins
*Attorney, Agent, or Firm*—Nilsson, Robbins, Bissell, Dalgarn & Berliner

[57] ABSTRACT

An automatic coffee brewing system for brewing coffee in a chamber and dispensing the brewed coffee into a container. The chamber is automatically flushed upon completion of the brewing cycle. A predetermined amount of coffee grinds is automatically inserted into the coffee brewing chamber through an open lid. The brewing chamber is then rotated until the lid is closed. Hot brewing water is then inserted into the chamber, while the lid is automatically locked to prevent leakage of the brewed coffee. The brewed coffee then is removed from the chamber. The chamber is then rotated to enable the coffee grounds to be flushed from the chamber. The chamber is then rotated into position for brewing another container of coffee. A conical-shaped filter in the chamber enables brewed coffee to pass through to an outlet and simultaneously, retains the grounds in the chamber. During the flush cycle, water is forced into the chamber and the coffee grounds are cleared from the filter. A sprayhead is positioned at the apex of the conical-shaped filter for directing water flow during the brewing and flushing cycles.

4 Claims, 12 Drawing Figures

AUTOMATIC COFFEE BREWING SYSTEM

BACKGROUND OF THE INVENTION

1. Field of the Invention

The field of art to which the invention pertains includes the field of automatic coffee brewing systems, particularly with respect to a system for automatically providing a measured amount of coffee and hot water into a brewing chamber and flushing the chamber upon completion of the brewing cycle.

2. Description of the prior art

In U.S. patent application Ser. No. 326,783 filed Jan. 26, 1973, there is described a conventional coffee brewing system for providing a predetermined amount of heated water which is discharged into a conventional brewing vessel. The brewing vessel is manually loaded with coffee grinds. Water filters through the brewing vessel and produces a container of coffee. Such a system requires that the brewing vessel be cleaned by the operator, and reloaded with coffee grinds each time a pot of coffee is brewed.

Automatic coffee brewing systems have been designed which eliminate the need for the operator to load the coffee into the brewing vessel. One drawback to prior art systems is that during the brewing cycle, leakage occurs from the brewing chamber. Additionally, after the coffee has been brewed, the brewing chamber must be flushed and the grounds removed.

The present invention provides an automatic coffee brewing system which brews a pot of coffee and automatically flushes the brewing chamber. A brewing container locking mechanism prevents leakage of the brewed coffee during the brewing cycle by sealing the chamber lid. The brewing chamber is rapidly and easily cleaned at the end of the brewing cycle.

SUMMARY OF THE INVENTION

An automatic coffee brewing system for brewing a pot of coffee and flushing the brewing chamber upon completion of the cycle. Initially, a predetermined amount of roast-ground coffee is automatically loaded into the brewing chamber. The brewing chamber contains a mechanism for automatically locking a chamber lid during the brewing cycle. When the brewing cycle has been completed, the lid is opened and the coffee grounds flushed from the chamber. The coffee brewing chamber contains a conical filter having a sprayhead at the filter apex. The sprayhead in the chamber directs the flow of hot water during the brewing cycle and flush water during the cleaning cycle.

DESCRIPTION OF THE PREFERRED EMBODIMENTS

Figure 1:
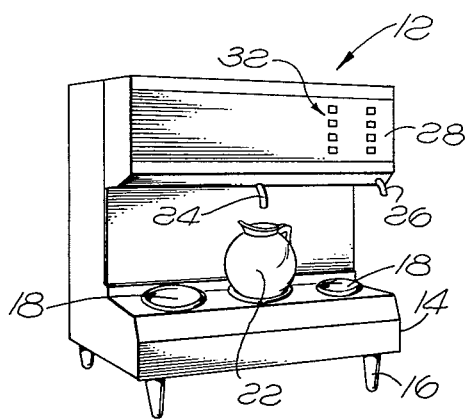
FIG. 1 is a perspective view of the automatic coffee brewing system made in accordance with the invention.

Referring now to FIG. 1 there is shown an automatic coffee brewing system 12 constructed in accordance with principles of the invention. The brewing system 12 comprises a stand 14 which normally rests on legs 16. A plurality of burner pans 18 are illustrated, although only one burner pan is required for warming brewed coffee stored in a container 22. Coffee from the automatic brewing system is dispensed through a first spigot 24 into the container 22.

A second spigot 26 is provided for enabling a user to obtain small amounts of hot water for making tea or hot soup from a hot water reservoir as is conventional. In the top section 28 of the brewing system, a plurality of indicator lights and buttons, illustrated generally as 32, enables the user to start the system as well as to provide an indication as to the system status. Typical lights could be used to provide an indication that the system is inoperable, or that the water is not heated to the desired temperature, or that other system conditions exist. Buttons could be provided to start or stop the system or to dispense hot water through the second spigot 26.

Figure 2:
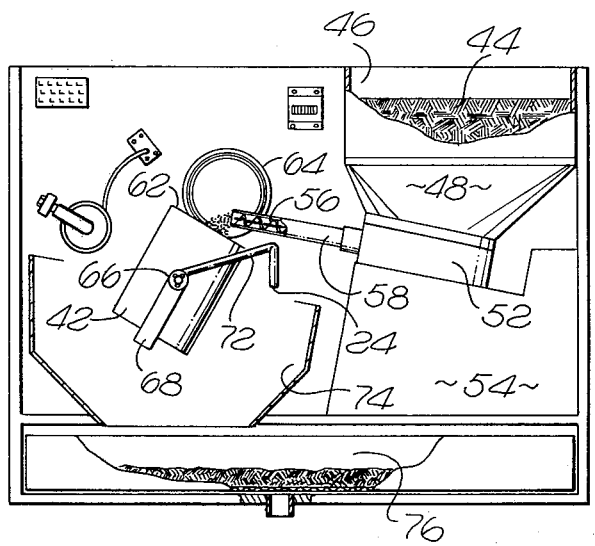
FIG. 2 is a partial front elevational view with a panel removed, of the automatic coffee brewing apparatus contained in the housing of FIG. 1.

Referring now to FIG. 2, there is illustrated the mechanism for feeding a predetermined amount of coffee grinds into a coffee brewing chamber 42. Coffee grinds 44 are stored in a reservoir 46 which is connected by a tapered funnel 48 to a feed chamber 52. The feed chamber 52 is mounted on a stand 54 in the housing. An auger 56 is connected to one side of the feed chamber 52. The auger is used to transport coffee grinds from the feed chamber into the brewing chamber 42. The auger 56 is housed in an elongate cylinder 58. The drive (not shown) for the auger 56 is mounted in the stand 54.

The brewing chamber 42 is of generally cylindrical configuration. The interior of the brewing chamber is accessible at its end 62 when a lid 64 is opened about its pivot point (not shown). When the lid 64 is in an open position and the chamber 42 is rotated to the position shown in FIG. 2, coffee grinds from the feed chamber 52 can be fed into the end 62 by means of the auger 56. The brewing chamber 42 is rotatable about a central axis 66 which is perpendicular to the axis of the cylindrical chamber 42. An external manifold 68 (whose purpose will be explained hereinafter) is secured to the outer surface of the brewing chamber. An outlet feed line 72 is connected to the brewing chamber 42. The feed line 72 enables brewed coffee in the brewing chamber 42 to be coupled to the first spigot 24. A shield 74 provides an anti-splash device when the chamber 42 is rotated to deposit the spent coffee grounds into the lower portion 70 of the housing.

Figure 3A:
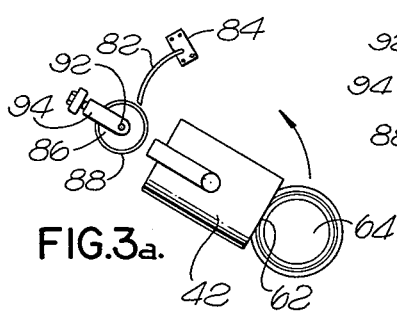
FIGS. 3a through 3f illustrate the various positions of the coffee brewing chamber during the operational cycles of the automatic brewing system of FIGS. 1 and 2.
Figure 3B:
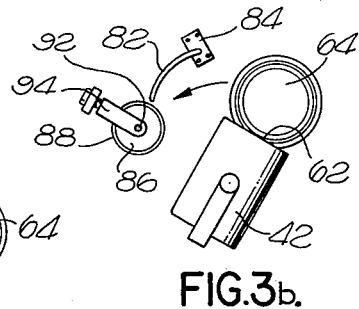

FIG. 3a illustrates the position of the brewing chamber 42 in its initial start or rest position prior to commencement of the coffee brewing cycle. The open end 62 of the chamber is in a relatively downward position causing the lid 64 to pivot away from the chamber by gravitational force. On commencement of the brewing cycle, the brewing chamber 42 rotates approximately 90° in a counter clockwise direction as shown by the arrow in FIG. 3a. FIG. 3b illustrates the position illustrated in FIG. 2, where coffee grinds are inserted into the brewing chamber 42. It should be noted that in the position of FIG. 3b, the lid 64 remains open.

The lid closing mechanism which is mounted adjacent the brewing chamber 42 comprises a cover guide 82 which typically is formed of a thin curved strip member one end of which is secured to a mounting plate 84 and the other end of which is positioned adjacent a freely rotatable wheel 86 having a rubber outer perimeter 88. The wheel 86 is rotatable about a spindle 92. The spindle 92 in turn is secured to one end of a rod 94, and the other end of the rod 94 is secured to a portion of the housing (not shown).

When the chamber has been rotated to the position shown in FIG. 3b, coffee grinds 44 are fed from the reservoir 46 into the chamber 42. When the predetermined amount of coffee grinds have been fed into the brewing chamber 42, the chamber is again rotated in a counter-closkwise direction to the position shown in FIG. 3c. As the chamber 42 rotates the lid 64 moves toward the chamber end 62 by means of the cover guide 82. When the lid approaches the freely rotatable wheel 86, and has been moved by the cover guide 82 to a closed position, a mounting guide 96 on the top of the lid is juxtaposed with the rubber outer perimeter 88 of the freely rotatable wheel 86. The compression of the rubber outer perimeter 88 against the mounting guide 96 is sufficient to form a seal between the lid 64 and the end 62 of the chamber 42.

Normally, an O-ring or other gasket material is also positioned between the lid 64 and the opening 62 in the chamber. When the seal has been attained between the lid 64 and the chamber 42, heated water enters the chamber and the brew cycle commences. The brewed coffee then exits the outlet feed 72 and is dispensed through the first spigot 24 into the container 22 as will be explained in greater detail hereinafter.

Figure 3C:
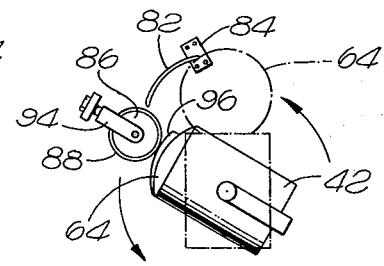
Figure 3D:
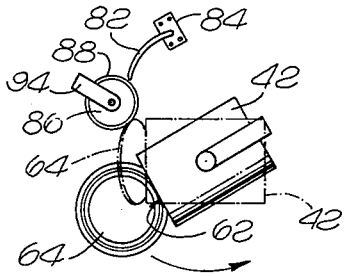
Figure 3E:
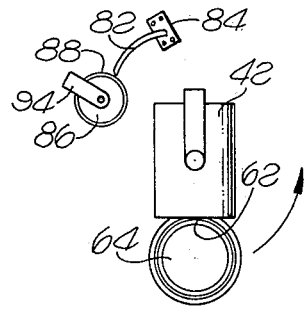

After the brewing cycle is completed, the brewing chamber 42 rotates in a counter-clockwise direction to the position illustrated in FIG. 3d, and the lid 64 is no longer in contact with the wheel perimeter 88. The lid 64 then automatically opens due to gravitational force and the inverted position of the container. At this time the system commences the flush cycle. Water enters the chamber, as will be explained in greater detail hereinafter, and the coffee grounds together with the flushed water start to empty into the lower portion 76 of the housing. When the chamber then rotates to the position shown in FIG. 3e, the end 62 of the chamber 42 is positioned so that the grounds and flush water completely empty into the lower portion 76 of the housing. The chamber then rotates to a position shown in FIG. 3f, and is again in a position for the brew cycle to be repeated.

Figure 3F:
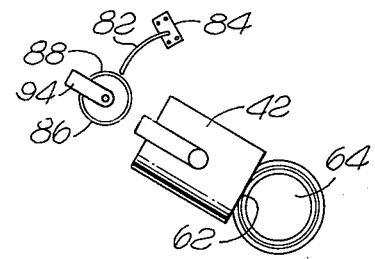
Figure 4:
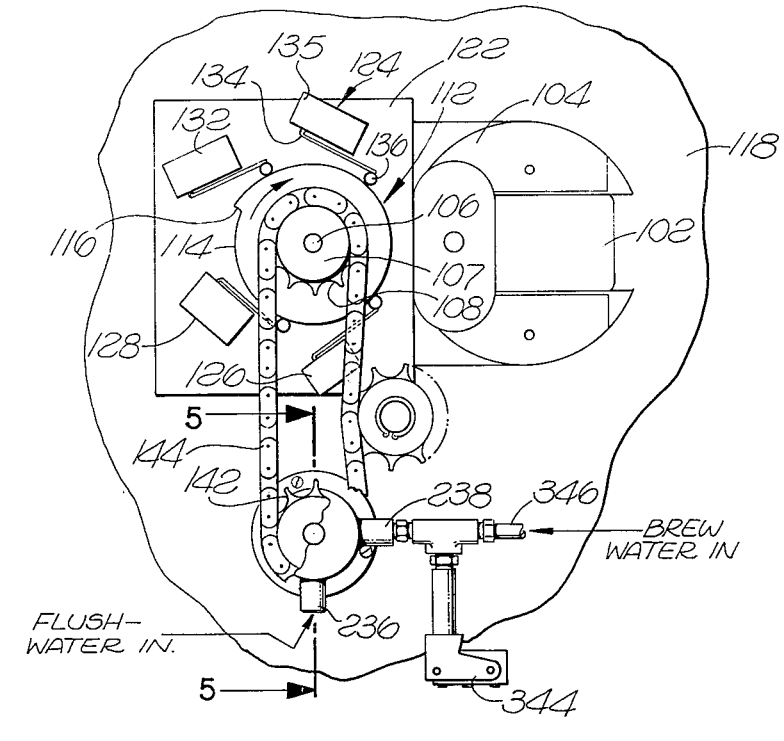
FIG. 4 is a top plan view, partially broken away, illustrating the drive mechanism used to rotate the coffee brewing chamber in the positions illustrated in FIGS. 3a through 3f.

Referring now to FIG. 4, there is shown a top plan view of the drive system used to rotate the brewing chamber 42 to the various positions illustrated in FIGS. 3(a–f). A conventional electric motor 102 is connected through a gearbox 104 to a driveshaft 106. The driveshaft 106 rotates a wheel 107 having a first set of teeth 108 around its periphery. A cam member 112 also secured to the driveshaft 106 and rotatable therewith, contains an outer cam surface 114 which is curved and abruptly changes shape at a riser or, a shoulder 116 on the cam surface.

Typically, the motor 102, gearbox 104, and drive shaft 106 are mounted on a housing plate 118 of the system in a conventional manner. A support plate 122 is used to mount a plurality of microswitches, illustrated as four microswitches 124, 126, 128, and 132 spaced around the cam surface 114. The microswitch 124 contains an armature 134 which extends from the microswitch housing 135 and terminates at a terminal 136. The terminal 136 normally rides on the outer cam surface 114 of the cam member 112. Each of the microswitches 126, 128, and 132 are identical to the microswtich 124 and will not be described in detail. As the cam member 112 rotates, and the terminal member 136 of the respective microswitches abruptly drop at the shoulder 116 of the cam member, the microswitch contact moves from a open position to a closed position, actuating an electrical circuit as will be explained hereinafter.

A second set of gear teeth 142, similar to the first set of gear teeth 108 is connected so as to rotate with the brewing chamber 42. A continuous gear chain 144 interconnects the first and second set of gear teeth 108 and 142. Rotation of the gear teeth 108 cause the gear teeth 142 and hence the brewing chamber 42 to rotate in the various positions as illustrated in FIGS. 3 (a–f).

Figure 5:
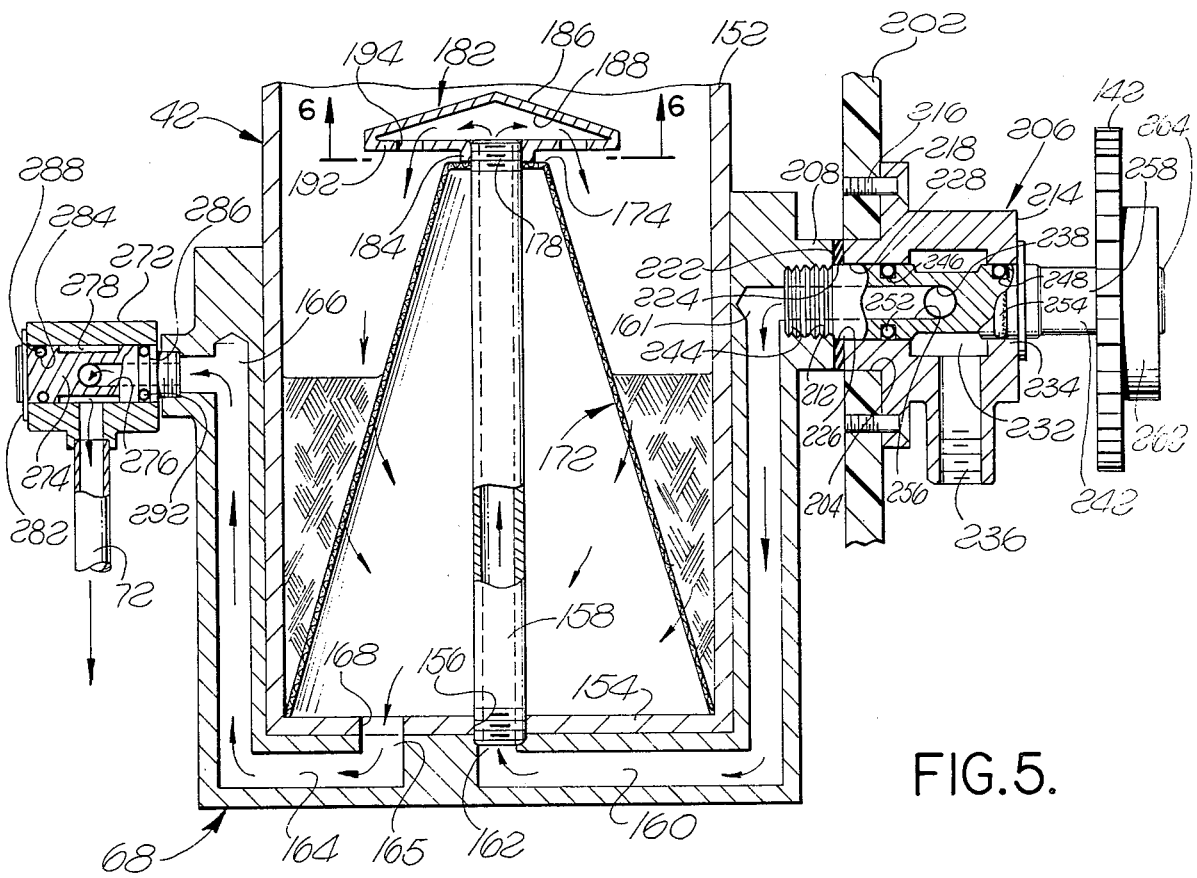
FIG. 5 is a cross-sectional view of the coffee brewing chamber of FIG. 4 taken along the line 4—4 thereof.

Referring now to FIG. 5, the brewing chamber interconnection with the external manifold 68 is illustrated in greater detail. The brewing chamber 42 is formed of a cylindrical side wall 152 and an integrally formed bottom wall 154. One end of an inlet pipe 158 is secured in a centrally formed threaded opening 156 in the bottom wall 154. The inlet pipe 158 extends axially through the brewing chamber 42. The pipe 158 adjacent to the bottom wall 154 communicates with an inlet passageway 162 of the manifold 68. The manifold 68 is formed of an inlet passageway 160 having a first port 161 and a second port 162 at opposite ends of the passageway. The second port 162 communicates with the inlet pipe 158 at the chamber bottom wall 154. The manifold 68 further contains an outlet passageway 164 having a first port 165 and a second port 166 at opposite ends thereof. The outlet passageway first port 165 communicates with an offset aperture 168 in the bottom wall 154 of the chamber.

Figure 6:
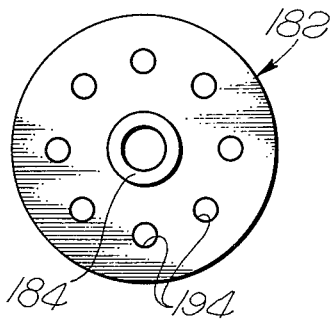
FIG. 6 is a bottom view illustrating the sprayhead used in the chamber of FIG. 5 taken along the line 6—6 thereof.

A filter 172 of generally conical configuration, has a base which abuts the interior junction of the cylindrical side wall 152 and the bottom wall 154. The filter 172 tapers toward a truncated apex 174. An end 178 of the inlet pipe 158 extends through an opening 176 in the truncated apex 174 of the filter 172. A sprayhead 182 is mounted on the end 178 of the pipe by means of a lip 184 which is threaded or otherwise secured thereto. The sprayhead contains a generally triangularly shaped top surface 186 which forms one end of a cavity 188 defined by the sprayhead. A bottom wall 192 of the cavity 188 is formed in a plane perpendicular to the axis of the brew chamber 42. The bottom wall 192 contains a plurality of orifices 194 shown in greater detail in FIG. 6. The orifices 194 enable water, which enters the inlet pipe 158, to pass into the sprayhead cavity 188 and be directed downwardly toward the outer surface of the filter 172. Referring again to FIG. 5, a housing flange 202 contains an opening 204. A water inlet sleeve 206 is secured in the opening 204. The inlet passageway 160 of the manifold 68 contains a water inlet opening section 208 which is coaxial with the axis of the housing flange opening 204. The water inlet opening section 208 contains an interiorly threaded sleeve 212. A water inlet housing 214 is secured to the housing flange 202 by means of a plurality of screws 216 which are threadably inserted into an abuting water inlet housing flange 218 and the housing flange 202. The free end 222 of the water inlet opening section 208 is spaced from the end of the water inlet housing 214 by means of a seal 224. The seal contains an opening 226 which is aligned with an opening in the internally interiorly threaded sleeve 212 of the water inlet opening section 208.

The water inlet sleeve 206 contains a reduced diameter front bore portion 228 which is aligned with the interiorly threaded sleeve 212. A cavity 232 is formed behind the reduced diameter front bore portion 228 into which water is fed to the brewing chamber during the flushing or coffee brewing cycles. An inwardly extending flange 234 defines the other end of the cavity 232.

Communication to the cavity 232 may either be through a flush water inlet 236 or through a brew water inlet 238 positioned at right angles to the flush water inlet 236 and shown more clearly in FIG. 4. A rotatable fitting 242 is threaded into the interiorly threaded sleeve 212 by means of threads formed on its front outer surface 244. The fitting 242 extends through the water inlet sleeve 206 and contains a first annular groove 246 formed adjacent the bore portion 228 of the fitting 206 and a second annular groove 248 formed adjacent the inwardly extending flange 234. A first O-ring seal 252 and a second O-ring seal 254 are positioned in the first annular groove 246 and the second annular groove 248, respectively, to form water tight seals between the rotatable fitting 242 and the water inlet sleeve 206. Water from the flush water inlet 236 or the brew water inlet 238 is fed into the cavity 232 and through passageway 256 of the rotatable fitting to the first port 161 of the manifold inlet passageway. As described in conjunction with FIG. 4, the secocnd set of gear teeth 142 is mounted on the end 258 of the rotatable fitting 242. An end plate 262 is fastened by means of a bolt 264 to the rotatable fitting 242. The end plate 262 and bolt 264 enable the gear teeth 142 to drive the rotatable fitting 242.

The brewed coffee outlet feed line 72 is coupled to a fixed cylinder 272 having a rotatable sleeve 274 positioned therein. The rotatable sleeve 274 has an inlet 276 which couples the second port 166 of the second passageway 164 to the outlet feed line 72, through a cavity 278 formed between the fixed cylinder 272 and the rotatable sleeve 274. A spring clip 282 is fastened to the rotatable sleeve 274 at a point where it extends beyond the fixed sleeve 272 enabling the rotatable sleeve to rotate with the brew chamber 42. A third annular groove 284 and a fourth annular groove 286 are respectively formed on the outer surface of the rotatable sleeve 274 on opposite sides of the cavity 278. O-ring seals 288 and 292 in the third annular groove 284 and fourth annular groove 286, respectively, are provided to prevent leakage from the cavity 278.

Figure 7:
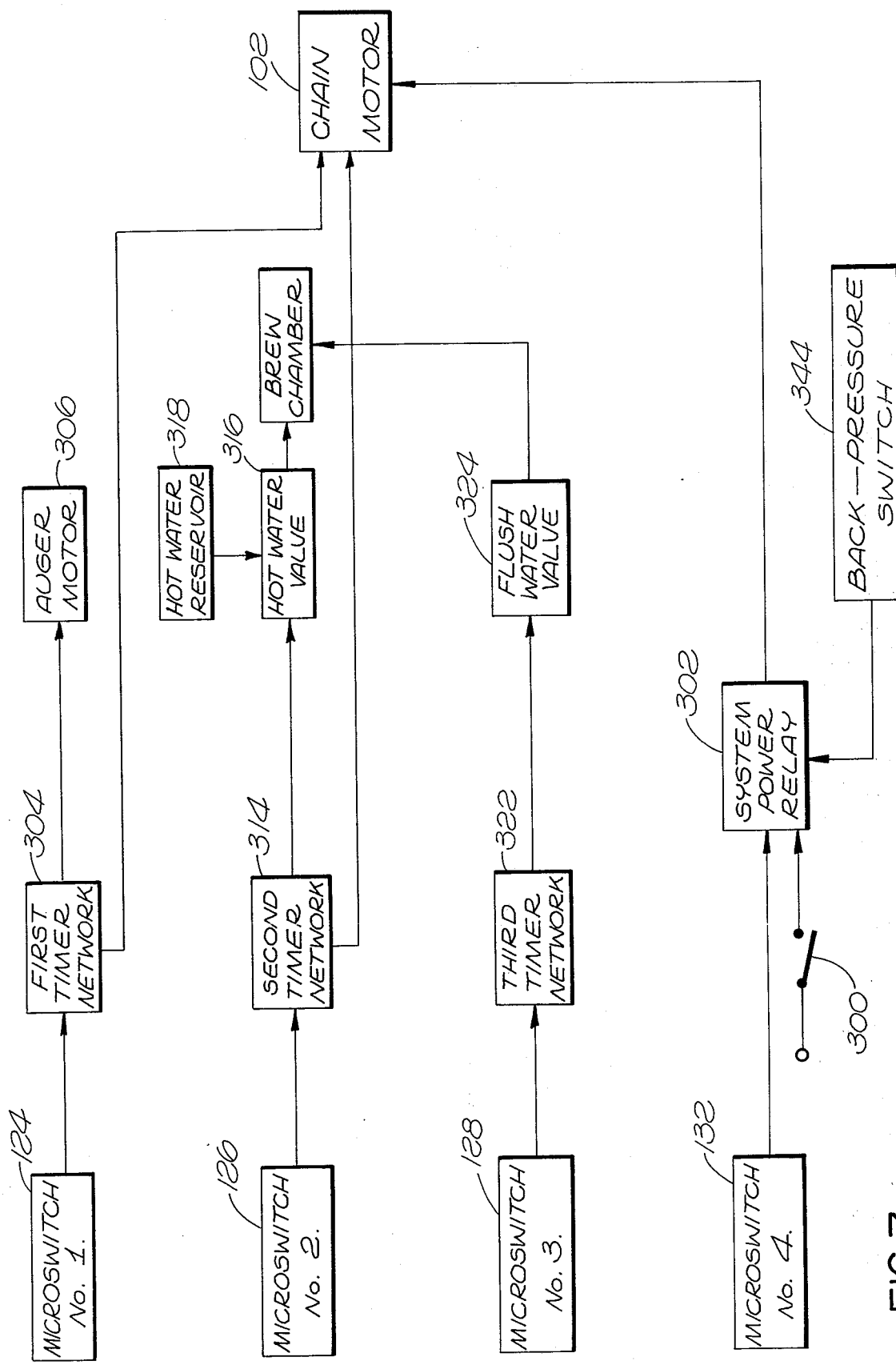
FIG. 7 is a schematic block diagram of the coffee brewing system of FIGS. 1–6 used to explain the operation of the system.

Referring now to FIG. 7, there is schematically illustrated a simplified block diagram of portions of the brewing system of FIGS. 1-6. Prior to commencement of a brewing cycle, the brewing chamber 42 is in the position shown in FIG. 3a When a container of coffee is desired, a main switch 300 is closed, actuating a system power relay 302. The relay 302 in turn actuates the chain motor 102 causing the continuous gear chain 144 to rotate the brewing chamber 42.

The chain motor 102 simultaneously rotates the cam member 112. When the brewing chamber has been rotated to the position shown in FIG. 3b, the first microswitch 124 is simultaneously closed. Closure of the first microswitch 124 operates a first timer network 304 which temporarily disconnects power to the chain 102 and actuates an auger motor 306. The auger motor 306 then drives the auger 56 an interval of time sufficient to fill a predetermined amount of coffee into the brewing chamber 42. The first timer network 304 then deactivates the auger motor 306 and the chain motor 102 rotates the brewing chamber 42 to the position shown in FIG. 3c.

When the brewing chamber reaches the position shown in FIG. 3c the chamber lid 64 is closed as previously explained. Simultaneously, the second microswitch 126 is actuated, deactivating the chain motor 102 and stopping rotation of the brewing chamber 42. The second microswitch 126 actuation operates a second timer network 314 which in turn opens a hot water valve 316. Hot water from a hot water reservoir 318 is fed through the inlet passageway 160 into the brewing chamber 42. The hot water passes through the orifices 194 and sprays onto the coffee grinds on the outer surface of the conical filter 172. Hot water passes through the filter 172, and into brewed coffee, flows through the outlet passageway 164 to the outlet feed 72 and into the container 22. It should be noted that a thermostatic or similar control normally delays the flow of hot water from the hot water reservoir until the water reaches a predetermined temperature.

After a predetermined interval of time, the second timer control 314 closes the hot water valve 316 and reactivates the chain motor 102. The chain 144 rotates the brewing chamber 42 to the position shown in FIG. 3d, and actuates the third microswitch 128. The third microswitch 128 closure operates a third timer network 322.

The third timer network 322 actuates a flush water valve 324 which feeds water from a source (not shown) into the flush water inlet 236 of FIG. 5. The flush water passes into the external manifold 68 inlet passageway 160 at a greater flow rate than the hot brewing water. Flush water at this high flow rate flows through the orifice 194 and strikes the filter 172 and causes the coffee grounds thereon to be loosened. As can be seen in FIG. 3d, the brewing chamber 42 is at an angled position and the flush water and grounds flow toward the open lid 64. At a predetermined interval the timer network 322 closes the flush water valve 324. The flush water and grounds are emptied as the container 42 continues to rotate. The timer network 322 and its function could also be performed by redesigning the cam surface 114. The operation of the flush water valve 324 would then be controlled by opening and closing the third microswitch 128.

When the chain motor 102 rotates the canister to the position shown in FIG. 3f, which is also the initial rest position, the fourth microswitch 132 is closed. The fourth microswitch 132 disengages the system power 302, and disconnects power to the chain motor 102.

In addition, a back pressure switch 344 is connected between the brew water sleeve 238 and a inlet hot water tap 346 as shown in FIG. 5. Should the pressure in the inlet of the system rise due to clogging of the filter 172, the system power relay 302 is deenergized and the chain motor 102 is turned off. Then the filter cone 172 must be cleaned and the system reactivated.

Typically, the filter is made of Nylon or similar material although stainless steel could be used as well.

I claim:

1. An automatic coffee brewing system comprising:
   a chamber for brewing coffee therein, said chamber being of generally cylindrical configuration and having a filter therein;
   said filter having a water inlet expanding from a first end of said filter and extending through said chamber and exiting a second end of said filter, a sprayhead coupled to said water inlet of said filter for directing water from said sprayhead to the outer surface of said filter; and
   means providing an outlet path for water passing through said filter to an outlet spigot.

2. An automatic coffee brewing system in accordance with claim 1 wherein said chamber is rotatable to a first position for enabling water to flow from said sprayhead through said filter when coffee is brewed in said chamber, and rotatable to a second position for enabling water to flow from said sprayhead toward said filter and flush coffee grounds from said filter surface.

3. An automatic coffee brewing system in accordance with claim 1 wherein said sprayhead has a cavity formed therein and a plurality of orifices for directing said water toward said filter outer surface.

4. An automatic coffee brewing system comprising:
   a coffee brewing chamber having a movable lid to provide access and seal said chamber;
   loading means for placing a predetermined amount of coffee in said chamber when said lid is moved to provide access to said chamber;
   locking means for sealing said lid to said chamber when said coffee is brewed in said chamber, said locking means including a cover guide which moves said lid toward a sealed position and said lid outer surface includes a guide, a freely rotatable wheel having a rubber outer perimeter, said guide on said cover being moved into a juxtaposed position with said rubber outer perimeter of said freely rotatable wheel to form a tight seal between the lid and the end of the brewing chamber;
   means for flushing said chamber after coffee has been brewed therein; and
   rotating means for rotating said coffee brewing chamber to a first position wherein coffee grinds are inserted into said brewing chamber by said loading means with said lid in a chamber access position, rotating said chamber to a second position wherein said chamber lid is secured to said chamber by said locking means and heated water is inserted in said chamber and coffee brewed therein, and rotating said chamber to a third position wherein said coffee grounds are flushed from said chamber by said means for flushing.

* * * * *

UNITED STATES PATENT OFFICE
CERTIFICATE OF CORRECTION

PATENT NO. : 3,941,042
DATED : March 2, 1976
INVENTOR(S) : Daniel Wells and James Tarrant It is certified that error appears in the above-identified patent and that said Letters Patent are hereby corrected as shown below:

Column 1, Line 57 after "brewing" insert --system--

Column 6, Line 57 after "closing" insert --of--

Column 7, Line 10 "expanding" should be --extending--

Signed and Sealed this

Twentieth Day of July 1976

[SEAL]

Attest:

RUTH C. MASON
Attesting Officer

C. MARSHALL DANN
Commissioner of Patents and Trademarks